D. WILLIAMS.
Cooking Stove.
Rx 28
No. 28.
Reissued Nov. 21, 1840.
9350X Related Doc
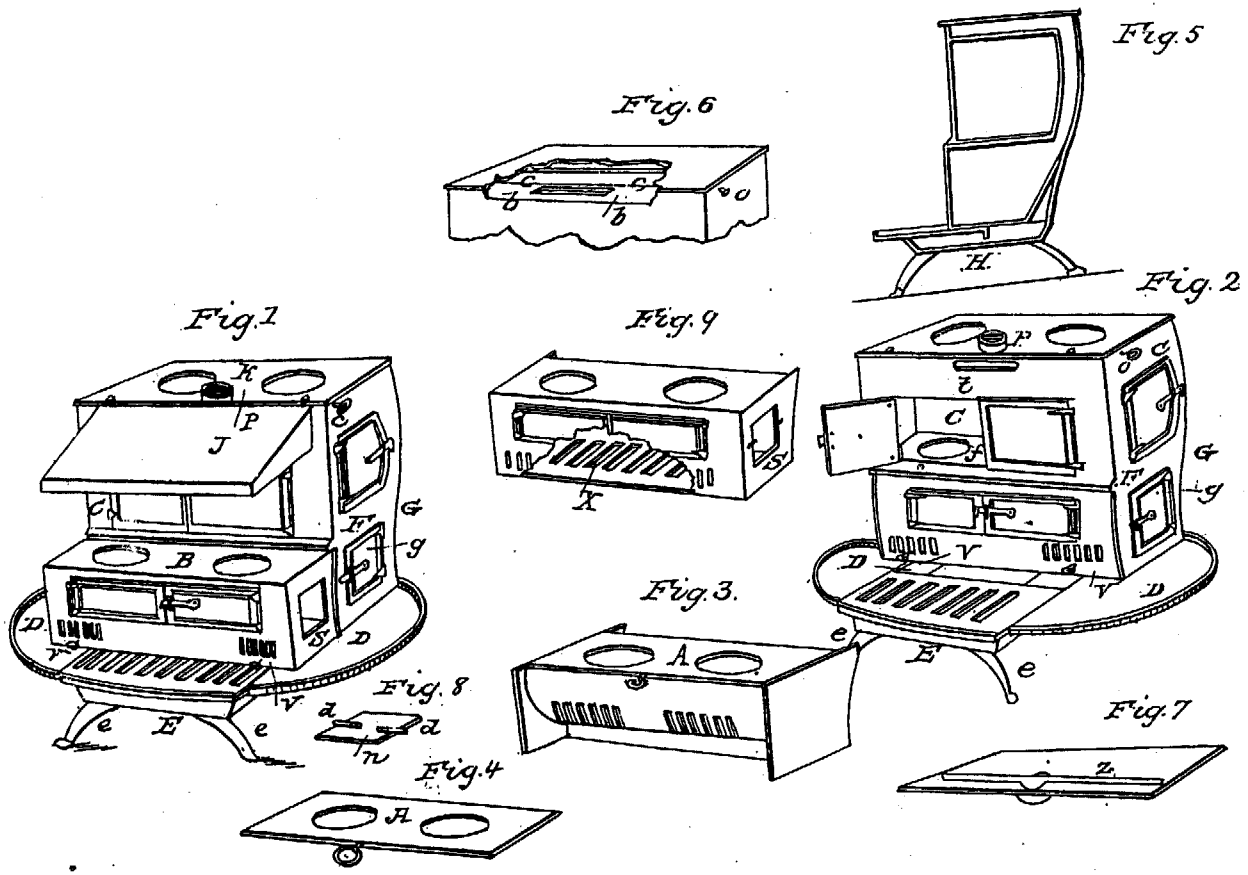

UNITED STATES PATENT OFFICE.

RX 28

DANIEL WILLIAMS, OF TROY, NEW YORK.

IMPROVEMENT IN COOKING-STOVES.

9350X RELATED DOC

Specification forming part of Letters Patent dated February 3, 1836; Reissue No. 28, dated November 21, 1840.

*To all whom it may concern:*

Be it known that I, DANIEL WILLIAMS, late of Schaghticoke, now of the city of Troy, in the county of Rensselaer and State of New York, have invented a new and useful Improvement in Cooking-Stoves; and I do hereby declare that the following is a full, clear, and exact description of the construction and operation of the same, reference being had to the annexed drawings, making a part of this specification, in which—

Figures 1 and 2 are perspective views of the entire stove in its different forms with said improvement. Fig. 3 is a perspective view of the movable grate by itself with its movable top plate on A. Fig. 4 represents the plate with its boiler-holes in it taken entirely off.

Fig. 1 represents the fire-place or furnace drawn from under the oven on which its top plate, B, with boiler-holes in it, is made permanent to the movable part. Fig. 2 represents it shoved under the oven.

C represents the oven or stationary part.

D represents the platform or hearth on which the fire-place moves.

E represents the sunken bottom or ash-pit.

The stove alluded to above is made in two parts—the one stationary, the other movable. That part which contains the fuel is movable, and is made to move backward and forward upon a cast-iron platform or hearth (represented by D, Figs. 1 and 2) under that part which contains the oven, (represented by C,) thus making it occupy more or less space, or according to the use intended to be made of it.

The cast-iron platform or hearth (shown at D, Figs. 1 and 2) is made conformable in size with the furnace or movable part, and of a circular or oval form in front, while the back edge the length of the oven is straight. It has a sunken bottom, as E represents in the drawings, for ashes to pass into, and it is raised from the floor by legs *eeee* far enough to protect the floor from burning, or as choice or convenience may direct.

Over the sink (represented by E, Figs. 1 and 2) is placed a plate of cast-iron, with openings running parallel with its side edges, and at any discretionary distance apart, and about half the length of the plate, for ashes to pass through when the furnace is not directly under the oven, as Fig. 1 represents it. On the under side, at or near its back edge, is a projection or flange, as shown by an end view, H, Fig. 5, extending down into the ash-pit about three-quarters of its depth, or more, to prevent the air from passing under, and thereby aid the stove in its draft. It is made to move backward and forward upon flanges or ledges, like sliding hearth in common use, and may be called a "sliding hearth" in this. (Shown at Q, Figs. 1 and 2.)

I will next proceed to describe the oven and the other parts: The oven is constructed with doors in the ends and a single or double door in front, at my option, and is the stationary part, made standing upon the back part of the cast-iron platform or hearth on which the oven end plate, F, and its corresponding opposite plate and back plate at G are fixed, which serve as legs or supports on which the oven rests. The plate F and its corresponding opposite plate should stand perpendicular with the platform or hearth, and be of such a height as will form a good proportion with the hearth or platform on which they stand. About the center of the plate F and its corresponding opposite plate I draw a line parallel with the lower ends of the same plate. This line will show how high or how low the bottom plate of the oven will be. The back edge of these plates is made angular or curved. The front edge is nearly straight. The width and height of that part of the plate F and its corresponding opposite plate which comes next to the hearth and as far up as the oven-bottom governs the width and height of the movable fire-place, which will be hereinafter described. The oven may be nearly square, or a little curved on the back part, and is surrounded by a flue formed on the top by means of the top plate on the back, by means of the back plate running from the top plate in a curved or angular form, and partially under the oven, conforming itself with the end plate, F, and its corresponding opposite plate, above described, to the back edge of the hearth or platform on which the fire-place or furnace moves.

In the bottom plate of the oven I make one or more boiler-holes for frying, &c., as shown in the drawings. Through the inner top plate of the oven and along its front edge, at equal distances from each end, I make an opening (shown at Fig. 6) for the purpose of carrying off steam produced in the oven. Directly opposite to this, through the front plate, as at *t*, Fig. 2, another opening is made for the same purpose, to carry off the steam generated in a cooking process from the movable part in front of the oven, by means of a tin fixed on the front edge of the top plate of the oven in such a manner that it may be taken off and put on at pleasure. It has its front and end edges turned down, and when fixed on the oven to conduct the steam up the pipe it extends over the pots and kettles in a slanting position, and when occasion requires it may be turned up vertically against the pipe without taking it entirely off. Its length along the oven is nearly that of the oven.

J, Fig. 1, represents said tin.

K, Fig. 1, represents the top plate with one or more boiler-holes, and P the pipe or collar. Directly under the collar or pipe I fix a damper (shown at *c c*, Fig. 6) extending the whole length of the oven, dividing the pipe in the center and in such a manner that when it lies down flatwise it closes the opening in the upper plate of the oven, and when turned up edgewise by a handle (represented by *o*, Figs. 1 and 2, and also Fig. 6) it opens it again, and also divides the smoke of the wood from the steam. There is a small flange, *z*, Fig. 7, on the under side of the top plate, for it to strike against when turned up, running through the center of the pipe-hole and the whole length of the oven. The pipe-collar is also divided in the center in a similar manner, as Fig. 6 shows, and also Fig. 7, and one sectional joint of the pipe may also be divided. The part containing the fuel or movable part (represented by B, Fig. 1, &c., is made of such a size as to freely slide under the oven and handsomely fill up the space which is surrounded by the lower end of the oven end plate, F, and its corresponding opposite plate and back plate at G, and oven-bottom, &c. In one end of the fire-place or furnace I make an opening for a door to put in fuel. The door is without hinges and put on with a slide. On the side opposite the handle little catches are fixed to hold the door when slid in.

S represents the opening. In Fig. 8, *n* represents the door, and *d d* the catches. A door is also provided at *g*, Figs. 1 and 2, so that when the furnace is shoved under the oven, these two will coincide with each other. The front is made with doors extending down about half-way. Below the door or doors vertical openings are provided to admit draft to the fire, as may be seen in Figs. 1 and 2. Openings are also provided in the bottom plate of the fire-place at X, Fig. 9, to let ashes pass through into the ash-pit, also to give draft to the fire. Under these openings little slides like dumpers may be fixed, so that they may be opened or shut, as occasion may require, by means of a wire attached to them. (Represented by *v* and *v*, Figs. 1 and 2.) The back plate of the fire-place forms an angle with the bottom plate of about thirty-five degrees, and is carried nearly as high up as the other parts of the furnace or fire-place, by which means a flue is provided. Its upper edge may be scalloped in rear of each boiler-hole, or left straight. Next I apply a top plate with boiler-holes in it, and make it permanent with the other parts of the furnace.

B, Fig. 1, is a top view of this part with its boiler-holes, &c. The covers to the boiler-holes in my stoves are made to form a perfect bevel with the plates in which they are placed, so that when the fire-place or furnace is shoved under the oven a double bottom is formed to the oven, which has the effect of regulating the heat, &c., in its action upon the oven; or the heat may be allowed to act to a greater or less degree upon the oven by moving the fire-place further in or out, or presenting it covered or uncovered. When the fire-place is shoved under the oven with the openings uncovered, the openings in the top plate of the fire-place will come directly under that in the bottom plate of the oven, (shown at *f* in Fig. 2,) and cooking may be done in the oven, &c.

Having thus described my stove for burning wood, let it be understood in this corrected description and specification for reissue for the same invention I do not claim the bare grate to slide from and under an oven, believing that is not new.

What I do claim, therefore, as my improvement, and desire to secure by Letters Patent, is—

The movable fire-place or furnace, as specified, constructed with a top plate having boiler-holes in it, as set forth, in combination with the stationary oven, so that when the fire-place with said boiler-plate on the top is shoved under the oven a double bottom is formed to the oven, which has the effect of regulating the heat in its action upon the oven, &c., all as herein described.

Subscribed this 15th day of September, 1840.

DANIEL WILLIAMS.

Witnesses:
JOB S. OLIN,
A. W. BLAIR.